United States Patent [19]
Yabe et al.

[11] Patent Number: 4,877,477
[45] Date of Patent: Oct. 31, 1989

[54] STRIP SUPPLYING DEVICE

[75] Inventors: Toshinori Yabe; Kazuo Ozaki, both of Tokyo, Japan

[73] Assignee: Bridgestone Corporation, Tokyo, Japan

[21] Appl. No.: 111,734

[22] Filed: Oct. 23, 1987

[30] Foreign Application Priority Data

Oct. 23, 1986 [JP] Japan .................. 61-252687

[51] Int. Cl.⁴ ........................................... B32B 31/18
[52] U.S. Cl. .................. 156/406.4; 156/425
[58] Field of Search .............. 271/265; 156/405.1, 156/425, 397, 406.4

[56] References Cited

U.S. PATENT DOCUMENTS 3,892,616  7/1975  Crites .......................... 156/405.1 X
4,474,338 10/1984  Hirano ......................... 156/405.1 X
4,596,617  6/1986  Ishii ............................ 156/130
4,738,743  4/1988  Satoh .......................... 156/405.1

FOREIGN PATENT DOCUMENTS 104303   4/1984  European Pat. Off. ......... 156/405.1
125146  11/1984  European Pat. Off. ......... 156/405.1
0134747  3/1985  European Pat. Off. .
203803   8/1987  Japan .
2108442  5/1983  United Kingdom .

Primary Examiner—Richard A. Schacher
Attorney, Agent, or Firm—Sughrue, Mion, Zinn, Macpeak & Seas

[57] ABSTRACT

In a strip supplying device, strip supplying members disposed immediately before a tire forming drum to supply strips to the drum are moved along the axis of the drum the direction of movement is controlled both in direction and in speed according to the rotation of the drum.

5 Claims, 3 Drawing Sheets

STRIP SUPPLYING DEVICE

BACKGROUND OF THE INVENTION

This invention relates to a device for supplying long narrow pieces, namely, strips to a forming drum (hereinafter referred to as "a strip supplying device", when applicable).

The present inventor has proposed a pneumatic tire under Japanese Patent Application No. 46746/1986 in which a belt-shaped member is spirally wound on a belt layer with its winding density changed in the tire widthwise direction as desired.

However, a device for supplying a material for forming a pneumatic tire, namely, the belt-shaped member to a forming drum has not been proposed in the art.

SUMMARY OF THE INVENTION

Accordingly, an object of this invention is to provide an apparatus suitable for performing the above-described operation; that is, a strip supplying apparatus.

The foregoing object and other objects of the invention have been achieved by the provision of a strip supplying apparatus which, according to the invention, comprises: supplying members disposed immediately before a forming drum, to supply strips to the drum while guiding the strips; moving means for moving the supplying members along the axis of the drum; detecting means for detecting rotation of the drum; and control means for controlling the moving means according to a result of detection of the detecting means to control the directions of movement and the speeds of movement of the supplying members.

It is assumed that, in the apparatus of the invention, the strips are wound on the drum while being guided by the supplying members. In this operation, the supplying members are moved by the moving means along the axis of the drum, so that the strips are spirally wound on the drum. On the other hand, the rotation of the drum is detected by the detecting means, and the result of detection is supplied to the control means. The control means supplies control signals to the moving means according to the result of detection. Thus, the directions of movement and the speeds of movement of the supplying members are controlled as required. As a result, the strips are wound on the forming drum with a desired winding density.

The nature, principle and utility of the invention will become more apparent from the following detailed description when read in conjunction with the accompanying drawings.

The parts (a) through (e) of FIG. 6 are explanatory diagrams for a description of the operation of the strip supplying device.

DETAILED DESCRIPTION OF THE INVENTION

One embodiment of this invention will be described with reference to the accompanying drawings.

Figure 1:
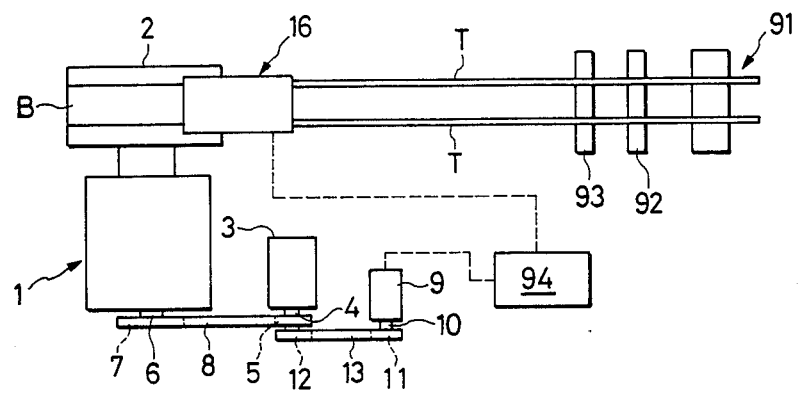
FIG. 1 is a plan view, partly as a block diagram, outlining the arrangement of one embodiment of this invention.

In FIG. 1, reference numeral 1 designated a band forming machine for forming a belt tread band. The machine 1 has a forming drum 2 whose diameter can be changed; 3, a drive motor; 8, an endless belt laid over a pulley 5 mounted on the rotary shaft 4 of the drive motor 3 and a pulley 7 mounted on the rotary shaft 6 of the rotary shaft 6 of the forming drum 2, to transmit the torque of the drive motor to the forming drum 2; and 9, detecting means, namely, a pulse generator. An endless belt 13 is laid over a pulley 11 mounted on the rotary shaft 10 of the pulse generator 9 and the pulley 12 of the rotary 4 of the motor 3. The pulse generator 9 operates to detect the speed of the drive motor 3 to detect the speed of the forming drum 2 to output pulses the number of which corresponds to the speed of the forming drum 2.

Further in FIG. 1, reference numeral 16 designates a device for supplying long narrow pieces, namely, strips T (hereinafter referred to as "a strip supplying device 16", when applicable), The strip supplying device 16 is disposed immediately before the forming drum.

As shown in FIGS, 2, 3 and 4, the device 16 has frames 17 which can be moved towards and away from the forming drum 2. The strip T is formed by coating a plurality of (for instance five to ten) cords with rubber. A guide rail 18 is secured to the frames 17 and a pair of shafts 19 and 20 which are threaded in opposite directions, are rotatably supported on the frames 17, in such a manner that the guide rail 18 and the threaded shafts 19 and 20 are parallel in the axis of rotation of the forming drum 2. A pair of supplying members 26 and 27 are slidably supported by the guide rail 18. The supplying members 26 and 27 are adapted to supply the strips T while guiding them, respectively. That is, the supplying members 26 and 27 are moved along the guide rail 18 as the threaded shafts 19 and 20 are rotated.

A pair of pulse motors 28 and 29 are mounted on the frames 17, respectively. Pulleys 32 and 33 are connected to the output shafts 30 and 31 of the pulse motors 28 and 29, respectively. The pulse motors 28 and 29 can be rotated separately or simultaneously in the same direction or in the opposite direction at the same speed or at different speeds. Endless belts 36 and 37 are laid over the above-described pulleys 32 and 33 and pulleys 34 and 35 connected to the threaded shafts 19 and 20, respectively, so that the torques of the pulse motors 28 and 29 are transmitted to the threaded shafts 19 and 20, respectively. Encoders 40 and 41 for detecting and controlling the speeds of the pulse motors 28 and 29 are coupled through couplings 38 and 39 to the rotary shafts 30 and 31 of the pulse motors 28 and 29, respectively.

The above-described threaded shafts 19, 20, pulse motors 28 and 29, and endless belts 36 and 37 form moving means 42 and 43, respectively, which operate to move the supplying members 26 and 27 along the axis of the forming drum. Each of the supplying members 26 and 27 has a moving stand 46, and a pair of guides 47 extended longitudinally are half buried in the moving stand 46. The remaining parts of the guides 47 are buried in a slider 48. That is, the sliders 48 are movably supported by the moving stands 46.

Figure 2:
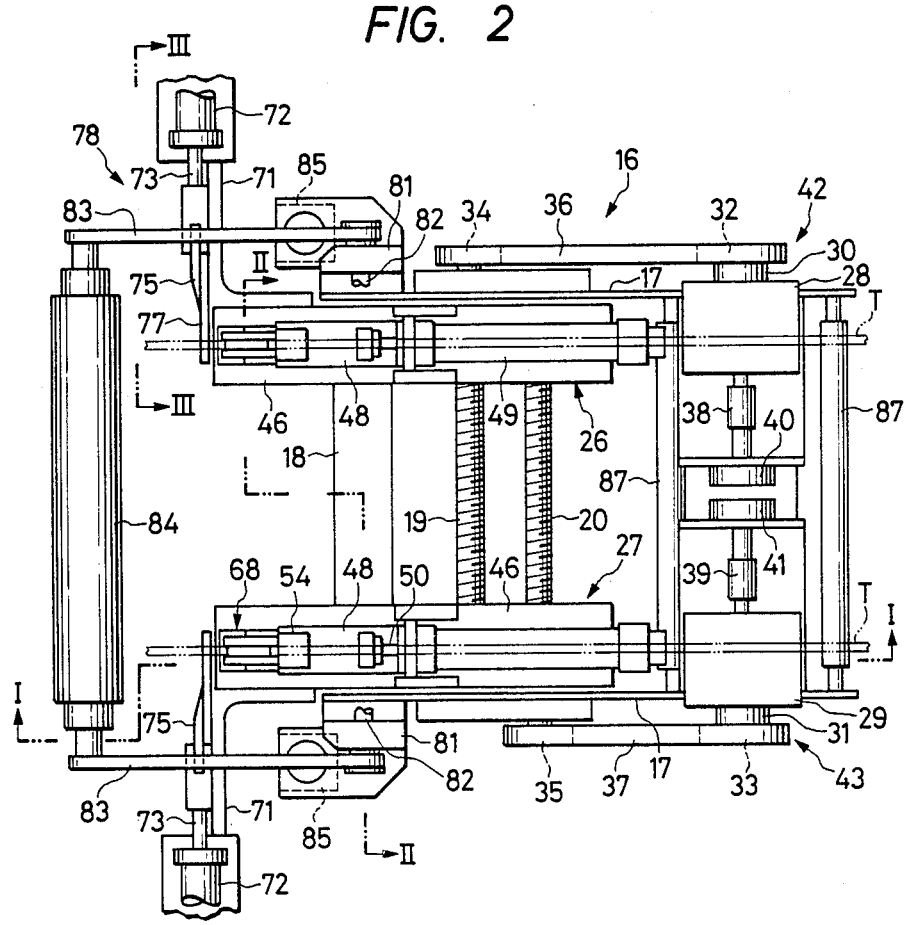
FIG. 2 is a plan view showing a strip supplying device in FIG. 1 in detail.
Figure 3:
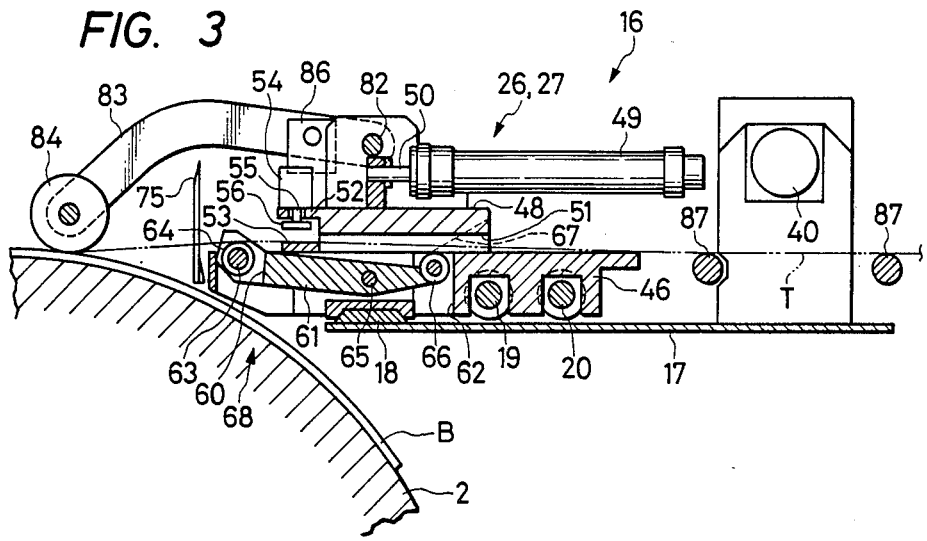
FIGS. 3 and 4 are sectional views taken in the directions of arrows I—I and II—II in FIG. 2, respectively.
Figure 4:
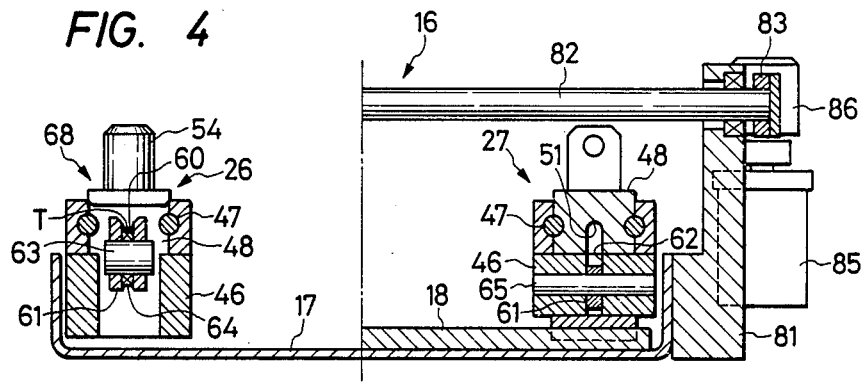
Figure 5:
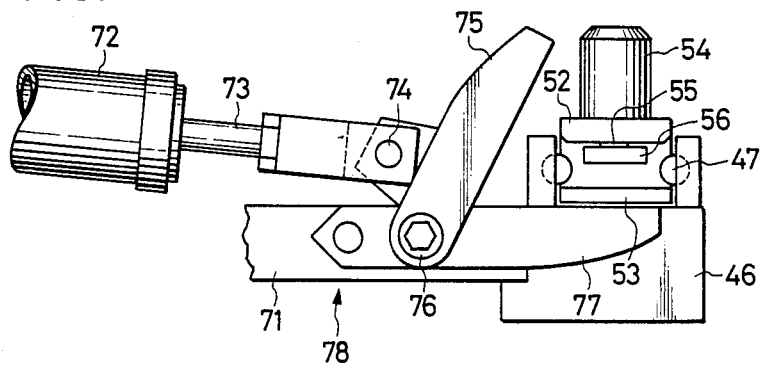
FIG. 5 is a view taken in the direction of arrow III—III in FIG. 2.
Figure 6A:
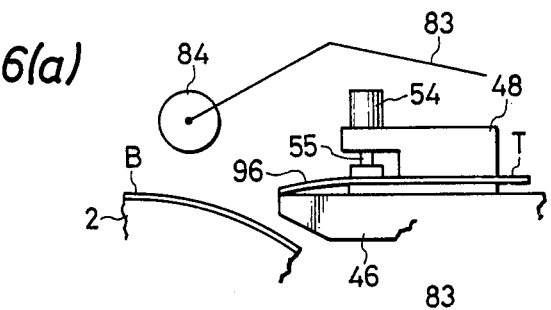
Figure 6B:
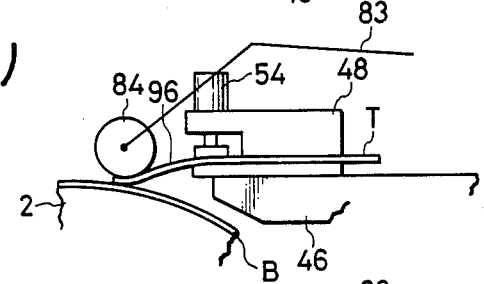
Figure 6C:
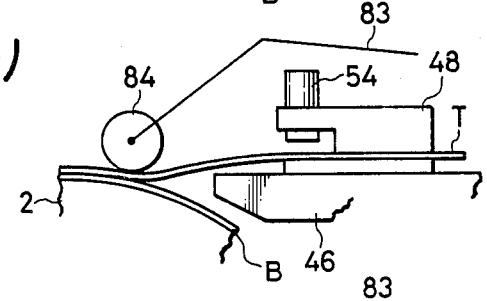
Figure 6D:
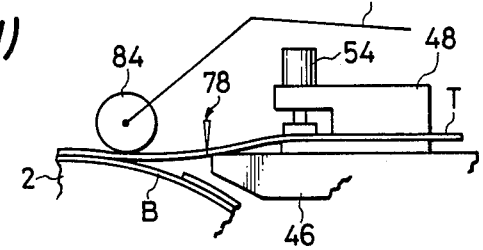
Figure 6E:
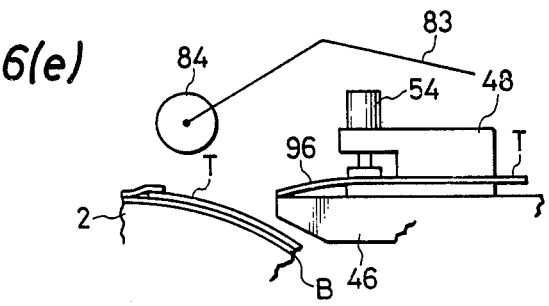

Further in FIGS. 2, 3 and 4, reference numeral 49 designates cylinders. The ends of the piston rods 50 of the cylinders 49 are connected to the above-described sliders 48 so that the sliders 48 are moved towards and away from the forming drum 2 with the operation of the cylinders 49. A passageway 51, through which the strip T passes, is formed in each of the sliders 48. As shown in FIGS. 3 and 5, the upper and lower parts of the end portion of the slider 48 are formed into a supporting plate 52 and a receiving plate 53. A cylinder 54 is secured to the supporting plate 52. A clamping plate 56 is connected to the end of the piston roll 55 of the cylinder 54 in such a manner that it is located between the supporting plate 52 and the receiving plate 53. Therefore, as the piston rod 55 is pushed out, the clapping plate 56 clamps the strip T together with the receiving plate 53.

A guide arm 61 is provided in a slit 62 which is formed in the movable stand 46 just below the slider 48. In the end portion of the guide arm 61, a vertical slit 60 is formed for regulating the widthwise position of the strip T when the latter T passes through the slit. A bearing 64 supported rotatably on a pin 63 secured to the guide arm 61 is disposed in the vertical slit 60, so that the strip T is moved over the bearing 64. The guide arm 61 is rockably supported through a pin 65 by the movable stand 46. Since the pin 65 is embedded in the rear portion of the guide arm 61, the front end portion of the latter in which the vertical slit 60 has been formed tends to move downwardly by its own weight. A roller 66 is rotatably supported at the rear end of the guide arm 61 in such a manner that it is in roll contact with the lower surface of the slider 48. A sloped surface 67, which is sloped upwardly and rearwardly, is formed in the lower surface of the rear end portion of the slider 48.

The above-described guide arm 61, bearing 64, roller 66, and sloped surface 67 form centering means 68 for centering the strip T.

In FIGS. 2, 3 and 5, a cylinder 72 is coupled through a bracket 71 to the end of each of the movable stands 46 in such a manner that it is in parallel with the guide rail 18. The end of the piston roll 73 of the cylinder 72 is coupled through a pin 74 to the middle of an upper edge 75, the base of which is rotatably coupled through a pin 76 to the bracket 71. A lower edge 7 is fixedly secured to the bracket 71 immediately before the movable stand 46. The lower edge 77 cooperates with the upper edge 75 to cut the strip T to a predetermined length.

The above-described cylinder 72, upper edge 75 and lower edge 77 form cutting means 78 for cutting the strip T.

In FIGS. 2, 3 and 4, a shaft 82 is rotatably supported by a pair of brackets 81 secured to the frames 17 in such a manner that the shaft 82 is in parallel with the guide rail 18 and is located just above the latter 18. Both ends of the shaft 82 are fixedly connected to the bases of substantially L-shaped arms 83 extended towards the forming drum 2, respectively. A pressing roller 84 parallel with the axis of rotation of the forming drum 2 is rotatably supported by the ends of the arms 83. Vertical cylinders 85 are secured to the brackets 81, respectively. The ends of the piston rods 86 of the cylinders 85 are coupled to the arms 83. Therefore, as the piston rods 86 retract, the arms 83 are swung downwardly so that the pressing roller 84 is brought into contact with the cylindrical surface of the drum. Rollers 87 are secured to the frames 17 to support the strips T from below.

Referring again to FIG. 1, reference numeral 91 designates a pair of winders on which the strips T are wound like rolls. The strips T unwound from these winders 91 are supplied to the supplying members 26 and 27, respectively. Reference numerals 92 and 93 designate festoon rollers. The strips T form festoons between these rollers 92 and 93. Reference numeral 94 designates control means such as a microcomputer, to which the output pulses of the pulse generator 9 are supplied. According to data on a tire being formed and the number of pulses provided by the pulse generator 9, the control means 94 applies control pulses to the pulse motors 28 and 29 thereby to control the directions of movement and the speeds of movement of the supplying members 26 and 27.

The operation of the preferred embodiment of the invention will be described.

It is assumed that, as shown in the part (a) of FIG. 6, the strips T rewound from the winders 91 has passed through the passageways 51 of the supplying members 26 and 27 and reached the movable stands 46. In this case, the piston rods 55 of the cylinders 54 of the supplying members 26 and 27 are pushed out, so that at each movable member 46 the clamping plate cooperates with the receiving plate 53 to clamp the strip T slightly aft of the end, so that the end portion of the strip T forms an over-hang 96. On the other hand, as the piston rods 50 of the cylinders 49 are retracted, the sliders 48 are moved away from the drum 2. As a result, the end portions of the guide arms 61 are protruded from the upper surfaces of the movable stands 46 to center the overhangs 96 of the strips T. As the piston rods 86 of the cylinders 85 protrude, the pressing roller 84 is moved away from the drum 2. Furthermore, as the piston rods 73 of the cylinders 72 are retracted, the upper edges 75 are substantially vertical as shown in FIG. 5.

Under this condition, the piston rods 50 of the cylinders 49 are protruded, the sliders 48 approach the drum 2 while being guided by the guides 47. In this operation, the rollers 66 are engaged with the sloped surfaces 67, and therefore the guide arms 61 are rocked counterclockwise about the pins 65 by their own weights, to cause the end portions of the guide arms to go into the slits 62, whereby the guide arms 61 are free from the sliders 48. As a result, the overhangs 96 of the strips T are supplied to the drum 2, and their ends are brought into contact, for instance, with a belt layer B wound on the drum 2. Under this condition, the piston rods 86 of the cylinders 85 are retracted so that the arms 83 are swung downwardly about the shaft 82. As a result, the pressing roller 84 pushes the end portions of the strips T against the belt layer B as shown in the part (b) of FIG. 6.

Thereafter, the piston rods 55 of the cylinders 54 are retracted to lift the clamping plates 56, so that the strips T are released. Under this condition, the piston rods 50 of the cylinders 49 are retracted to move the sliders 48 away form the drum 2. In this operation, the strips T are not moved because their end portions have been pressed against the belt layer B by the pressing roller 84. Furthermore, in this operation, since the rollers 66 have been moved downwardly by the sloped surfaces 67, the guide arms 61 are swung clockwise so that their end portions are protruded above the surfaces of the movable stands 46, so that centering the strips T is started again.

As the drum rotates, as shown in the part (c) of FIG. 6 each strip T is centered by the centering means 68 and is bonded to the belt layer B being pushed against the drum by the roller 84. In this operation, the pulse generator 9 detects the rotation of the drum 2, and supplies pulses, the number of which correspond to the number of revolutions of the drum, to the control means 94. Data on a tire to be formed has been stored in the control means 94 in advance. According to the data thus stored and the pulse signal from the pulse generator 9, the control means 94 applies the control signals to the pulse motors 28 and 29 so that the rotary shafts 30 and 31 of the pulse motors 28 and 29 are rotated in predetermined speeds at predetermined directions, respectively. The rotation of the rotary shafts 30 and 31 are transmitted through the endless belts 36 and 37 to the threaded shafts 19 and 20 to turn the latter 19 and 20, so that the supplying members 26 and 27 are moved along the axis of the drum 2. As a result, the strips T are spirally wound on the drum 2 while being traversed along the axis of the drum 2.

In this operation, the directions of movement of and the speeds of movement of the supplying members 26 and 27 are determined from a kind of a tire to be formed; however, they are separately controlled with the control pulses applied to the pulse motors 28 and 29 by the control means 94 as was described above. Therefore, the strips T can be wound on the drum 2 with the winding density in the axial direction of the drum being changed in compliance with the kind of the tire to be manufactured. This operation can be achieved with high efficiency because two strips T are wound with the two supplying members 26 and 27 simultaneously.

When the strip winding operation approaches the final stage, the rotation of the drum 2 is stopped, and the piston rods 55 protrude to clamp the strips T. Under this condition, the piston rods 73 of the cylinders 72 are protruded to turn the upper edges 75 to cut the strips T immediately before the movable stands 46 as shown in the part (d) of FIG. 6. Thereafter, the piston rods 73 are retracted, and the drum 2 is turned, so that the rear ends of the strips T are stuck on the drum 2. Under this condition, the piston rods 86 are protruded to lift the roller 84 from the drum 2 as shown in the part (e) of FIG. 6. Reinforcing layers, specifically a layer and a cap are bonded to the end portion of the belt layer B, to suppress the deformation of the belt end portion. Next, a tread is bonded to the belt layer B thus treated to form a belt tread band. The band is removed form the drum 2 and delivered to the following step.

As is apparent from the above description, the strips can be wound on the forming drum with a desired winding density.

What is claimed is:

1. A strip supplying device comprising:
   supplying means for supplying long-narrow strips formed by coating cords with rubber to a forming drum while guiding said strips, said supplying means being disposed immediately before said drum;
   moving means for moving said supplying means along the axis of said drum so that said strip is spirally wound on said drum with said strip's winding density changed in said drum widthwise direction as desired while being guided by said supplying means;
   detecting means for detecting rotation of said drum and producing an output; and
   control means for controlling said moving means according to the output of said detecting means, to control the directions of movement and the speed of movement of said supplying means.

2. A strip supplying device as claimed in claim 1 further comprising a frame movable towards and away from said drum, a guide rail secured to said frame wherein said moving means comprises:
   a pair of shafts threaded in opposite directions and rotatably supported on said frame in such a manner that said guide rail and said threaded shafts are parallel to the axis of rotation of said drum;
   a pair of pulse motors mounted on said frames, respectively, and rotated separately or simultaneously in the same direction or in opposite directions at same speed or at different speeds;
   endless belts for transmitting a torques of said pulse motors to said threaded shafts, respectively; and
   whereby said moving means operates to move the supplying means along the axis of said drum.

3. A strip supplying device as claimed in claim 1 further comprising:
   centering means for centering said long narrow strips, said centering means being formed by a guide arm mounted on a bearing, a roller on one end of said guide arm, and a sloped surface adjacent said roller; and
   cutting means for cutting said long narrow strips, said cutting means being formed by a cylinder having a piston, an upper edge movable by said piston and a fixed lower edge cooperatively aligned with said movable upper edge.

4. A strip supplying device as claimed in claim 1 wherein supplying means are adapted to supply said long narrow strips while guiding said strips, respectively, and moved along guide rail as said threaded shafts are rotated.

5. A strip supplying device as claimed in claim 1 wherein said detecting means comprises a pulse generator, said pulse generator detecting the rotation of said drum and said output comprises pulses, the number of said pulses corresponding to the number of revolutions of said drum.

* * * * *